United States Patent [19]

Sato

[11] 4,152,584
[45] May 1, 1979

[54] MAGNETIC CARD READING APPARATUS WITH NOVEL CARD FORWARDING MEANS

[75] Inventor: Isuke Sato, Hatano, Japan

[73] Assignee: Kabushiki Kaisha Synaps, Tokyo, Japan

[21] Appl. No.: 735,407

[22] Filed: Oct. 26, 1976

[30] Foreign Application Priority Data

Sep. 21, 1976 [JP] Japan ............................ 51/127005[U]

[51] Int. Cl.² ...................... G06K 7/08; G06K 13/24; G11B 25/04
[52] U.S. Cl. .................................. 235/475; 235/486; 360/2
[58] Field of Search .................. 360/2; 235/61.11 D; 236/486, 475, 479, 482

[56] References Cited

U.S. PATENT DOCUMENTS

| | | | |
|---|---|---|---|
| 3,787,661 | 1/1974 | Moorman et al. | 235/61.11 D |
| 3,836,753 | 9/1974 | Pass | 235/449 |
| 3,899,659 | 8/1975 | Nakai et al. | 360/2 |
| 3,940,796 | 2/1976 | Haun et al. | 360/109 |

Primary Examiner—Vincent P. Canney
Attorney, Agent, or Firm—Wenderoth, Lind & Ponack

[57] ABSTRACT

A magnetic card reading apparatus for use as a teaching aid includes a card forwarding device which is operated by placing a magnetic information card in a starting position on a card path to move the card in a forward direction under a constant pressure and at a uniform speed. The card forwarding device has a lever member operated upon contact with the card when it is in its starting position, an arm member operatively associated with the lever member, and a pressure supply device operatively associated with the arm member for placing the card under pressure and moving it forward at a uniform speed.

The apparatus further may include a card return device which is operated upon depression of an appropriate control button for moving the card back to the starting position or any selected position for repeated reading.

13 Claims, 11 Drawing Figures

MAGNETIC CARD READING APPARATUS WITH NOVEL CARD FORWARDING MEANS

BACKGROUND OF THE INVENTION

1. Field of the Invention

This invention relates generally to a magnetic card reading apparatus for use as a teaching aid, and more particularly to a pressure supply structure in the apparatus which is operated by initially placing the card in position so that it can move the card in a forward direction under a constant pressure and at a uniform speed. The apparatus further may include a card return device which is operated by depressing an appropriate button for moving the card back to its initial position or any selected position.

2. Description of the Prior Art In a conventional apparatus of the type disclosed herein, the magnetic information card is usually read by moving either the card or the magnetic read head or transducer relative to the other, and the movement of the card or head must be at a constant speed. When the head is moved relative to the card which remains stationary, However, problems are involved from both electrical and mechanical standpoints if there is a need for moving the heat at a uniform speed or without any variation in speed within its range of movement. Theoretically, it appears to be less problematical in this respect to move the card relative to the head. Although the above problems may thus be obviated, a different problem must be considered. That is, if it is necessary that the card at regular or uniform speeds along the card path, the card is very likely to slip out of the path. For this reason, the apparatus must be designed and manufactured so as to prevent such slipping of the card and thus to permit the card to travel at a uniform speed. For this purpose, a combination of a pinch roller and a capstan roller may be provided for holding the card under appropriate pressures and thus moving it by the cooperative action of the two rollers on opposite sides of the card. As it is extremely difficult or almost impossible always to place the two rollers in an opposed spaced relation opposite so that a passage can be defined therebetween which has a predetermined gap smaller than the thickness of the card, it is possible that as an alternative to bring the pinch roller into contact with the capstan roller with an appropriate pressure. In this alternative form, the pinch roller is made of resilient material such as rubber, and the capstan roller is made of metal. It is not desirable, however, that the two rollers always be kept in contact as described above since the rubber pinch roller can be damaged or worn by the frictional resistance between the rollers or can be subjected to deformation due to the pressure of the metallic capstan roller. In the light which are present in the above problems of the alternative form of the device, it is desirable that the two rollers be capable of being so moved away from each other when the apparatus is not in use, whereas during operation of the apparatus they are moved closer to each other for holding the card therebetween under pressure. The above operation of the two rollers can be accomplished by means of an associated handle such as a lever handle operated for opening and closing the lid of the apparatus independently or regardless of the presence of a card on the card path, but this may possibly make the operation of the apparatus difficult since a complex the operation is involved as can readily be understood from the above.

Upon completion of the reading of the card the trailing end of which has traveled past the transducer head, or at any desired position of the card which is traveling forward, it is also desirable that the card can be selectively moved back to its initial position or to any selected position without the necessity of removing the card from the apparatus and then placing it in a starting position again so that the desired information on the card can be obtained over again. It is very clear, however, that time consuming operations are necessary for removing the card and replacing it in the starting position, and it is also necessary to ensure that the card is placed in the proper starting position each time the card is read. There is known a conventional apparatus of the type which also includes a card return device which is selectively operable for selectively moving the card back to its initial position or to any selected position. In the conventional return device, a card is moved back by means of the power driven roller which includes a gear engageable with the gear of a driving roller. Thus, depression of the control button causes the gear of the driven roller to engage the gear of the driving roller and then to bring the driven roller into contact with the card, thus moving it backward. As readily understood from the the above, the two gears which are selectively engageable with each other, become worn by long-time repeated use thereof. This may result in lack of accuracy with which the card is returned at a constant speed and under a uniform pressure.

SUMMARY OF THE INVENTION

In the light of the problems and disadvantages of the prior art, it is therefore one object of the present invention to provide an improved magnetic card reading apparatus which includes a pressure supply structure acting as a card forwarding means which is operated upon sensing the insertion or placement of a card onto a starting position on a card traveling path so that the card can be moved forward under a constant pressure and at a uniform speed.

It is another object of the present invention to provide a card forwarding device in the card reading apparatus, said device comprising a combination of a lever member and an arm member which are automatically operated in response to the insertion of a card into the apparatus so as to place the card between the two rollers which move the card in a forward direction under a constant pressure and at a uniform speed.

It is a further object of the invention to provide a card forwarding device which is simple in construction, economical and easy to operate.

It is a still further object of the invention to provide an improved card return device in the card reading apparatus which eliminates the use of gears which are selectively engagable with each other and which includes a lever and an arm which are operatively connected to produce an automatic card return without the necessity of any gears.

It is still another object of the invention to provide a card return device which includes a driver roller and a driven roller which are directly operated by means of a lever and an arm which in turn are operable by a control button.

It is another object of the invention to provide a card return device which is selectively operable for moving the card back to its starting position or to any selected position.

BRIEF DESCRIPTION OF THE DRAWINGS

Those and other objects, features and advantages of the present invention will become apparent from the following description of the specification, the appended claims and the accompanying drawings in which:

DESCRIPTION OF THE PREFERRED EMBODIMENTS

Figure 1:
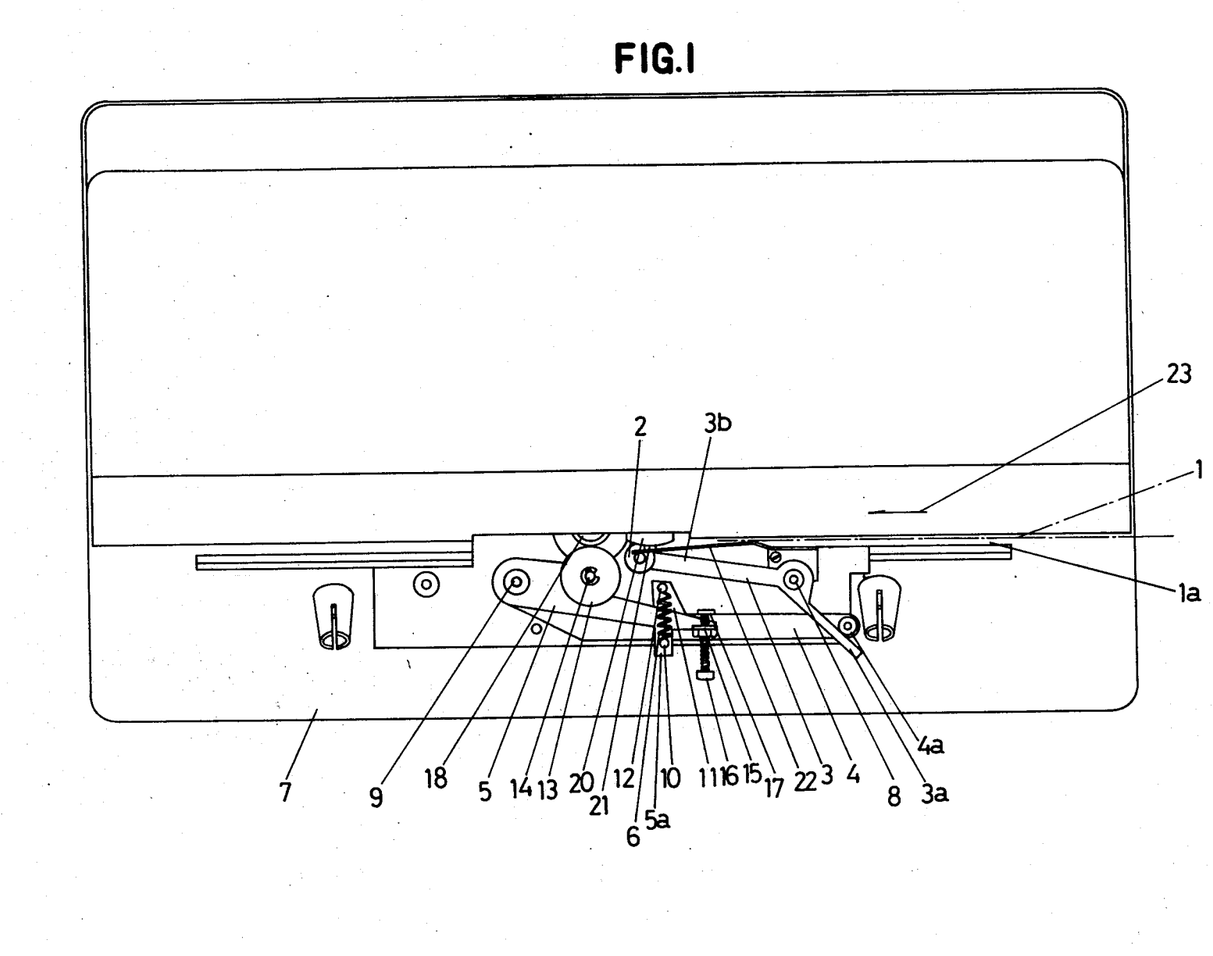
FIG. 1 is a plan view of a card forwarding device according to the invention for use in the magnetic card reproducing apparatus.
Figure 2:
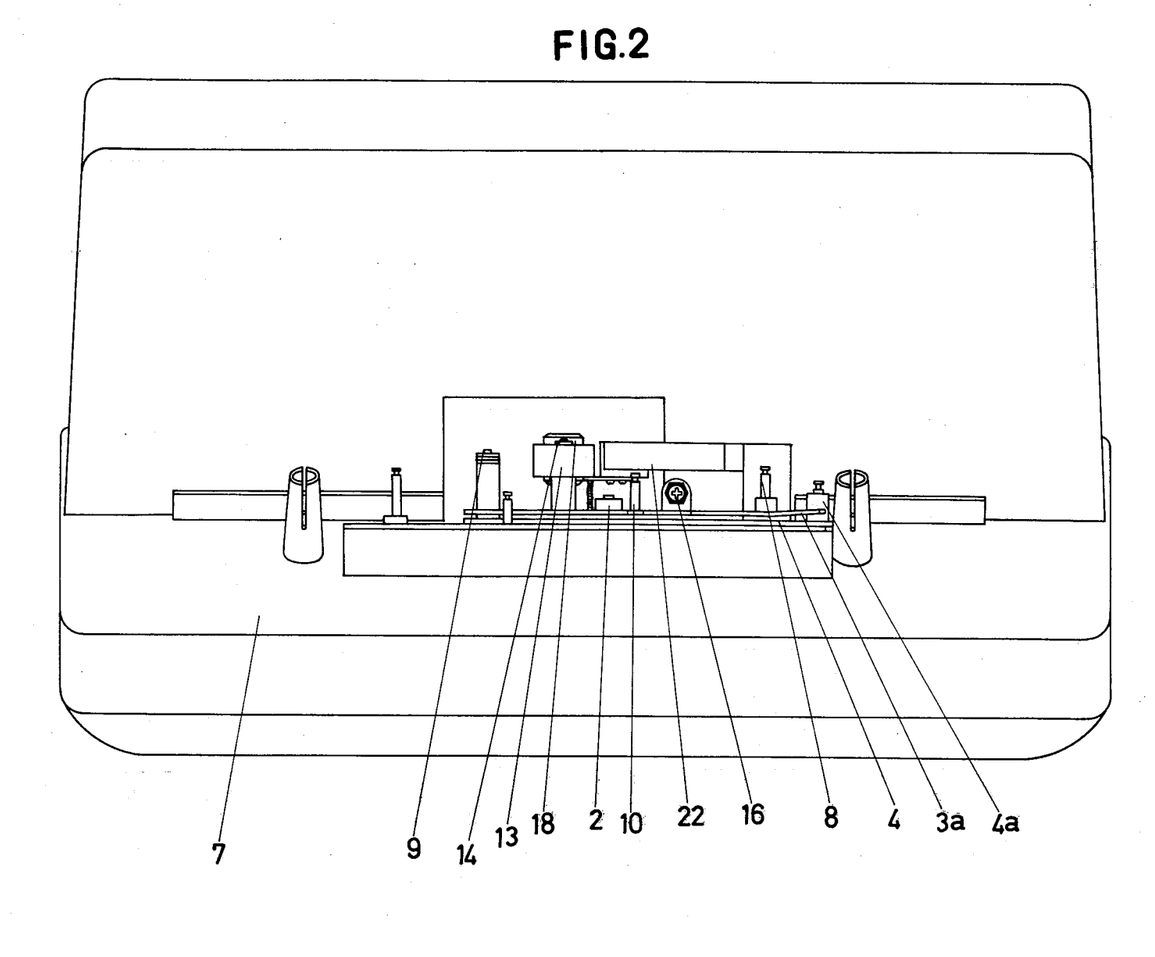
FIG. 2 is a side elevation view of the card forwarding device of FIG. 1.

One embodiment of the card forwarding device according to the invention is shown in FIGS. 1 through 4, in which a chassis is designated by reference numeral 7 on which a lever member 3 is pivotally supported by means of a shaft 8. The lever member 3 has an armlike portion 3b extending from the pivot point 8 and having a roller 2 rotatably connected to the end thereof, said roller 2 being normally positioned across the card travelling path so as to be engaged by a magnetic card 1 which is moved from a starting position along the card traveling path 1a to swing the lever number 3, and has another armlike portion 3a extend from the pivot point 8 and contacts a roller 4a which is connected rotatably to the free end of an operating arm member 4. The opposite end of the arm member 4 from the above free end is rotatably supported on a shaft 9 which is secured to the chassis 7. A pressure arm member 5 has one end also rotatably mounted on the shaft 9, and has at the other end thereof a projection 5a extending from the edge thereof as shown. The arm member 4 has a projection 11 extending from the edge thereof as shown. The arm member 4 and pressure arm member 5 are resiliently connected by means of a spring 6 the ends of which are secured to the respective projections 11 and 5a by means of pins 10 and 12. The pressure arm member 5 has a shaft 14 thereon and a pressure applying member in the form of a pinch roller 13 which is rotatably supported on shaft 14. Pressure arm member 5 has a bent up portion 15 extending upwardly from the arm member 5 near the free end thereof. The operating arm member 4 also has a bent up portion 17 extending upwardly therefrom in lateral alignment with the bent up portion 15 of the arm member 5. As shown in FIG. 1, an adjustable screw or similar means 16 is inserted through the bent up portion 15 and extends into abutment with the bent up portion 17. A capstan roller is generally designated by 18, and is engageable with the pinch roller 13 which is operatively moved toward the capstan roller 18 and engages the latter when the card 1 is placed in its starting position and is pushed in a forward direction along the card path 1a. Reference numeral 19 designates a flywheel shown by the dot/dash lines in FIG. 3; a magnetic reproducing head or transducer assembly is provided along the card path 1a, and a pad 21 on the end of a pad carrying flat spring 22 is provided to press the card against the head 20.

Figure 3:
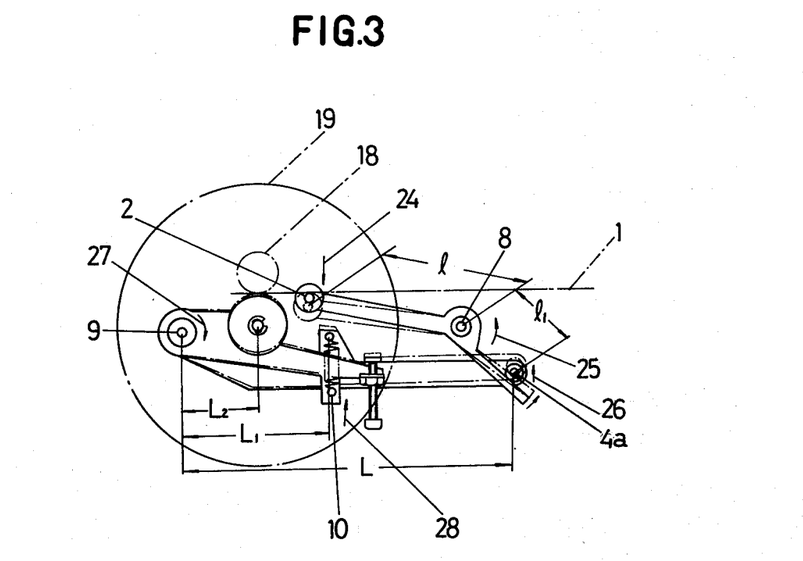
FIG. 3 is a diagrammatic plan view of the card forwarding device of FIG. 1, illustrating all associated members and parts in operative and inoperative positions shown by the solid lines and dot-dash-lines, respectively.
Figure 4:
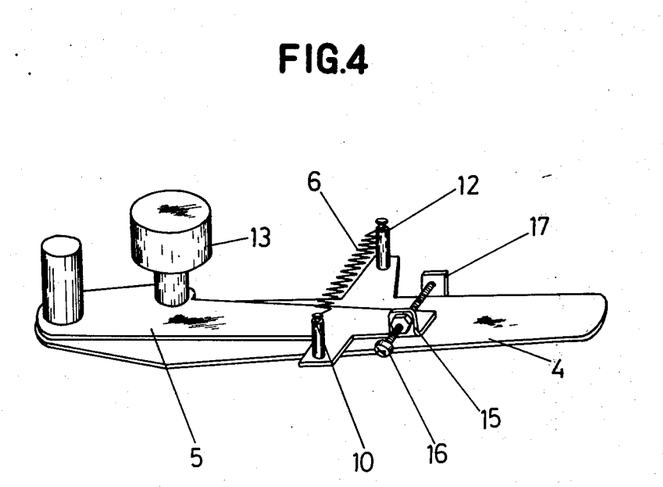
FIG. 4 is a perspective view of the card forwarding device of FIG. 1, illustrating in details the operative relationship between the operating arm and the pressure arm.

The operation of the card forwarding device shown in FIGS. 1 to 4 will be described with reference to FIGS. 1 and 3. The card is first inserted in a starting position on the card traveling path 1a and is then pushed in the forward direction indicated by a solid arrow 23 in FIG. 1, causing the leading end of the card 1 to engage the roller 2. Further movement of the card 1 in the forward direction causes the roller 2 to be moved in the direction indicated by a solid arrow 24 in FIG. 3 and thus the lever member 3 to rotate about the shaft 8 in the direction of arrow 25 or counterclockwise. The rotation of the lever member 3 causes the operating arm member 4 causes the arm member 4 to turn about the shaft 9 in the direction indicated by the solid arrow 27 in the clockwise direction in FIG. 3. Consequently, the pressure arm member 5 is pulled and moved in the direction indicated by the solid arrow 28 under the action of the spring 6, turning around the shaft 9 in the direction 27. This causes the pinch roller 13 to be moved closer to the capstan roller 18 and thus to engage the roller 18 with an appropriate pressure. The leading end of the card 1 is gripped between the rollers 13 and 18, which cooperatively move the card 1 in the forward direction.

In the embodiment described above, the distance l between the roller 2 and shaft 8, the distance $l_1$ between the shaft 8 and roller 4a, distance L between the shaft 9 and the axis of the roller 4a, the distance $L_1$ between the shaft 9 and the pin 10 and distance $L_2$ between the shaft 9 and axis of the pinch roller 13 are selected so that an increased amount of pressure will be applied to the roller 2 and then transmitted to the pinch roller 13. In the above case, however, the force applied to the roller 2 is transmitted to the pinch roller 13 through the spring 6 which controls the amount of the force applied to the pinch roller 13 such that a proper amount of force is applied to the roller 13 so that an excessive pressure of the pinch roller 13 on the capstan roller 18 is not produced. The screw 16 is adjusted to that the distance between the pinch roller 13 and capstan roller 18 is properly set.

Figure 5:
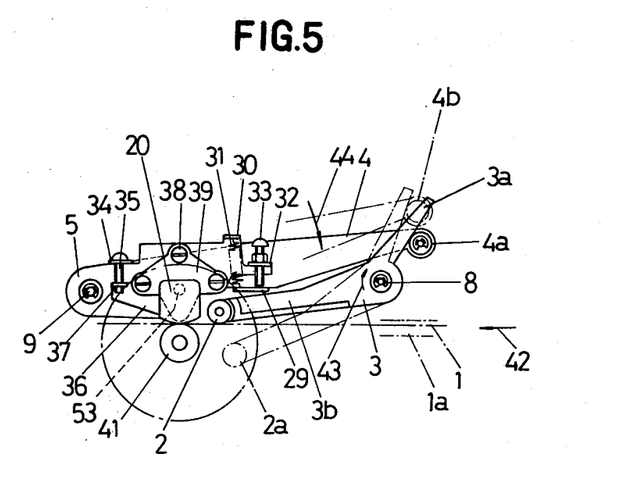
FIG. 5 is a plan view showing another example of the card forwarding device according to the invention.
Figure 6:
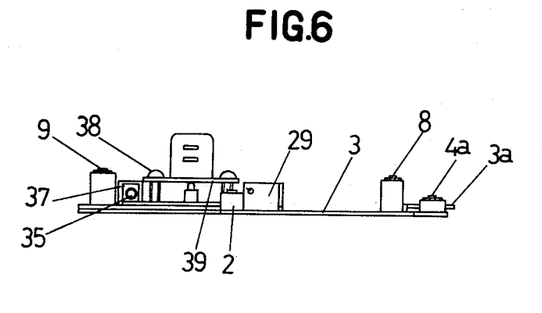
FIG. 6 is a side elevation view of the card forwarding device of FIG. 5.

Referring next to FIGS. 5 and 6, another preferred embodiment of the card forwarding device is described. A lever member 3 is rotatably supported on a shaft 8 secured to the chassis 7, and has one armlike portion 3b having at the end thereof a roller 2 normally extending across the path 1a of the card 1 and the other arm 3a engaging the roller 4a rotatably mounted on the free end of the operating arm member 4. The arm member 4 is rotatably supported at the other end thereof on a shaft 9 secured to the chassis 7, said shaft 9 also having the one end of the pressure arm member 5 coaxially rotatably mounted thereon. The operating arm member 4 has a bent up projection 29 extending upwardly therefrom as shown, and the pressure arm member 5 has a projection 30 extending upwardly therefrom as shown. The two arm members 4 and 5 are operatively connected with each other by means of a spring 31 which is connected between the projections 29 and 30. The pressure arm member 5 has a further projection 22 extending upwardly therefrom through which a stop 33 passes. The stop 33 is usually in the form of a screw, and is usually in abuttment with the projection 29 on the operative arm member 4. The pressure arm member 5 has a projection 34 near the pivoted end of the member 5, said portion 34 having a screw 35 therethrough. A mounting plate 36 has a bent up portion 37 opposite the projection 34, and the screw 35 threadedly passes through the projection 34 and extends to the projection 37. The plate 36 is pivotally mounted on pivot 53 on the arm member 4. Secured on the plate 36 by three screws 38 is a further plate 39 and on plate 39 is installed a transducer head assembly 20. A rubber covered capstan roller 41 is shown opposite the transducer head 20. In the operation of the device shown in FIGS. 5 and 6, a card 1 is initially placed in the starting position on traveling path 1a and is then pushed forward in the direction indicated by the solid arrow 42, thereby causing the roller 2 to be moved from the position 2a indicated by the dot-dash lines in FIG. 5 to the position indicated by the solid lines. Movement of the roller 2 as shown causes the lever member 3 to rotate on shaft 8 in the direction of arrow 43 and thus the armlike portion 3a of the lever member 3 to move the roller 4a from the position 4b shown by the dot-dash-lines in FIG. 5 to the position shown by the solid lines. Concurrently, the operating arm member 4 is moved in the direction of arrow 44 while the projection 29 moves therewith in the same direction. This operation causes the pressure arm member 5 to be moved in the same direction under the action of the spring 3. The movement of the pressure arm member 5 then acts on the mounting plate 39 via the connecting screw 35 so that the plate 39 will move on the pivot 53 in the same direction while the transducer head assembly 20 on the plate 39 will also move together with the plate 39 and be brought into contact with the capstan roller 41. In this manner, the card 1 is gripped between the head assembly 20 and capstan roller 41 which cooperatively move the card 1 in the forward direction under the required pressure and at a uniform speed. This arrangement prevents slipping or escaping of the card 1 from the card path 1a while the card 1 is moving past the head assembly 20 in the forward direction for reading.

Figure 7:
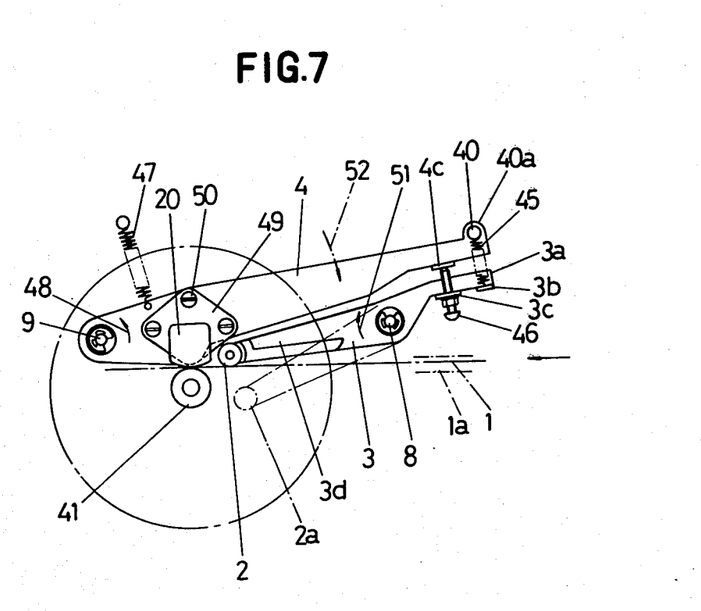
FIG. 7 is a plan view showing still another example of the card forwarding device according to the invention.

FIG. 7 shows still another example of the card forwarding device, in which a lever member 3 is rotatably supported on a shaft 8 secured to the chassis 7. The lever member 3 has one armlike part 3d extending from the pivot point at shaft 8 and having a roller 2 rotatably connected to the end of the arm 3d, said roller 2 normally extending across the card path 1a so as to be engaged by the card 1 when the card 1 is moved along the path 1a. The lever member 3 also has another armlike part 3a having a projection 3b extending therefrom as shown, and an operating arm member 4 has a projection 40a extending from the free end thereof as shown. The two members 3 and 4 are operatively connected with each other by means of a spring 45 one end of which is secured to the projection 3b on the part 3a and the other end of which is secured to the projection 40a on the arm member 40 by means of a pin 40. The lever member 3 has a bent up portion 3c extending upwardly therefrom and the operating arm member 4 has a bent up portion 4c extending upwardly therefrom. A screw 46 passes through the portion 3c and abuts the portion 4c. This screw 46 can adjust the distance between the pin 40 and projection 3b so that the tension of the spring 45 and the distance between the arm member 4 and lever member 3 can be adjustably controlled. A spring 47 has one end secured to the chassis 7 and the other end secured to the operating arm member 4. This spring 47 is usually such as to bias arm member 4 in the direction shown by the solid arrow 48 in FIG. 7 so that it will normally pull the arm member 4 in the direction 48. A reproducer head supporting plate is designated by 49 and screws generally designated by 50 are provided for securing the supporting plate 49 to the operating arm member 4. In the embodiment described above, as shown in FIG. 7, the screw 46 may be inserted from the side of the portion 4c and then made to abut the portion 3c. In the operation of the device in FIG. 7, the card 1 is initially placed at the starting position on the card path 1a and is then pushed in the forward direction, thereby causing the roller 2 to be moved from the position 2a shown by the dot-dash-lines to the position 2 shown by the solid lines and thus causing the lever member 3 to rotate about the shaft 8 in the direction 51. The rotation of the lever member 3 as shown causes the free end of the operating arm member 4 to be pulled by the action of the spring 45, resulting in rotation of the arm member 4 on shaft 9 in the direction of arrow 52. This operation causes the head assembly 20 to be moved closer to the capstan roller 41 for engagement, and the card 1 is thus gripped between the head 20 and capstan roller 41 which cooperatively advance the card 1 under the appropriate pressure and with the required speed.

The combination of the pinch roller 13 and capstan roller 41 is shown in FIGS. 1 to 4, and the combination of the reproducing head assembly 20 and capstan roller 41 is shown in FIGS. 5 and 7. In each case, the pinch roller 13 or head assembly 20 is selectively operated so that the pinch roller 13 or head assembly 20 can be moved closer to and engage with the capstan roller 41. The pinch roller 13 or head assembly 20 is operated so as to exert the required force on the capstan roller 41 through the card 1 which travels therebetween. However, the invention is not limited to the embodiments shown and described above.

It has been described that the card 1 is in rolling contact with the roller 2 of the lever member 3 so as to operate the lever member 3. Alternatively, the roller 2 may be replaced by a sliding plate having a small frictional resistance which is in sliding contact or engagement with the card 1. In this way, the lever member 3 has the same operational effect as when a roller is provided and in which the member 3 operates in response to the insertion of the card 1. In all the embodiments shown in FIGS. 1 through 7, the pressure means such as the pinch roller and reproducer head assembly are selectively operable by the movement of the lever and arm members, the operation of which is responsive to the movement of a card along the card path so that, for example, the pinch roller can be moved closer to the capstan roller and coacts with the latter to move the card in the forward direction under the required pressure, thus preventing the escape or slipping of the card out of the card path.

Figure 8:
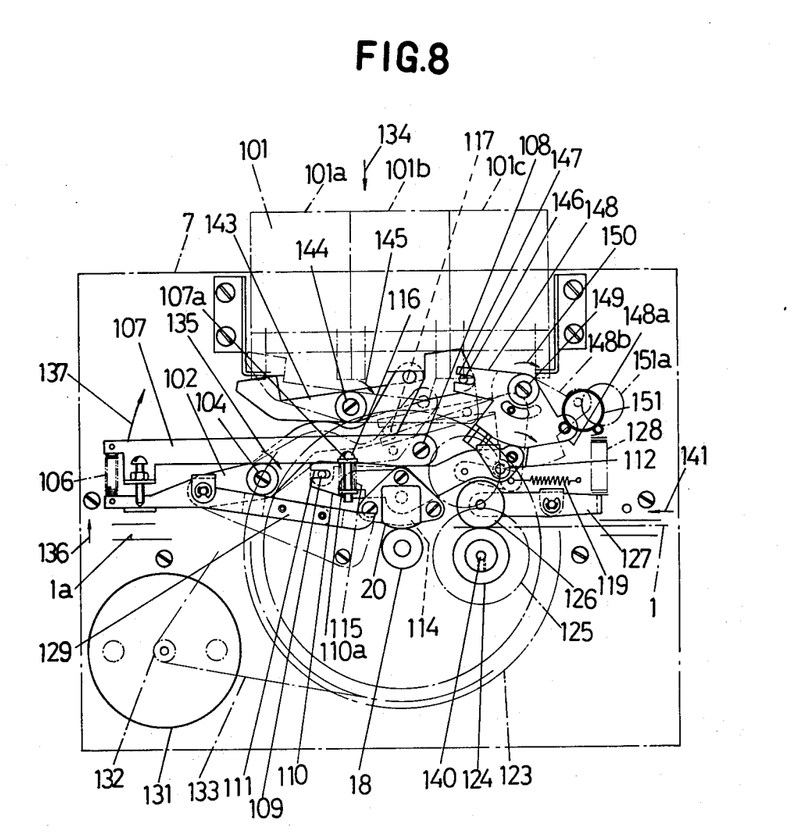
FIG. 8 is a plan view of a card return device for use in a magnetic card reading apparatus according to the invention.
Figure 9:
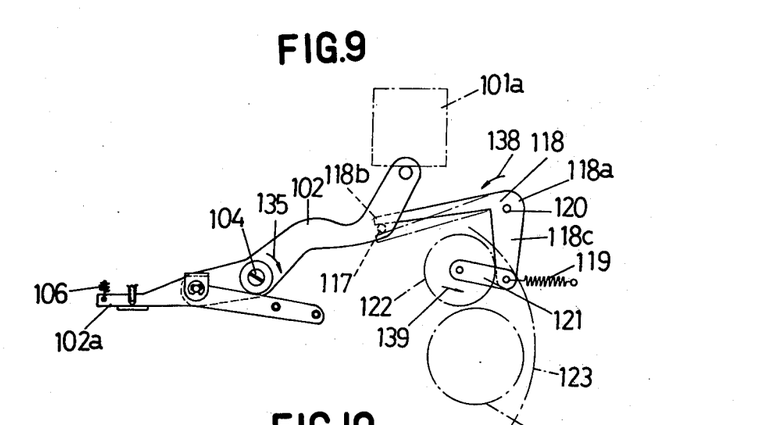
FIG. 9 is a plan view of ports of the card return device of FIG. 8 illustrating the operative relationship between the lever and arm members.
Figure 10:
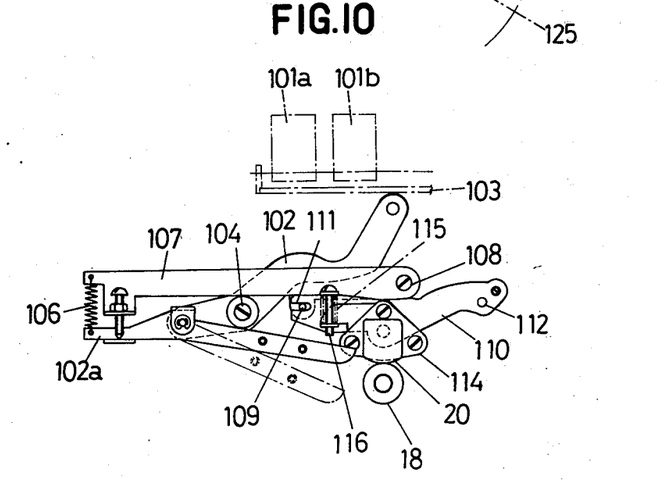
FIG. 10 is a plan view of ports of the card return device in FIG. 8 illustrating the relationship between the lever and associated member.
Figure 11:
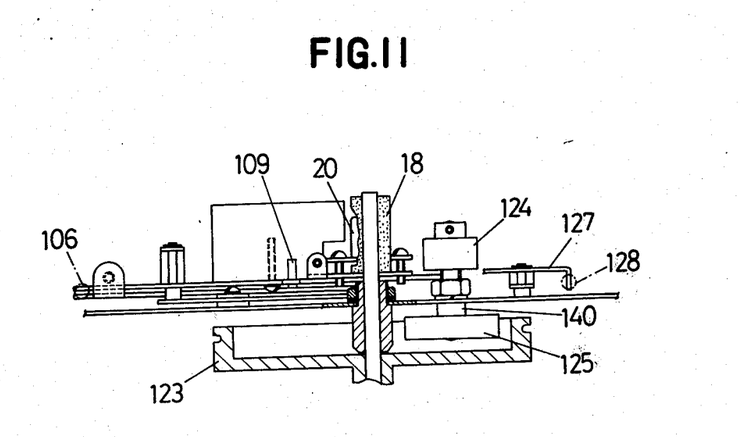
FIG. 11 is an elevation view, partly in section of the card return device of FIG. 8.

The card return device according to the invention is shown in FIGS. 8 to 11, and will now be described in detail. Reference is first made to FIG. 8 in which the arrangement of the card return device is schematically illustrated, including the arrangement of the card forwarding device described earlier and which includes some parts which are operatively associated with the operation of the card return device. A control button arrangement generally designated by 101 includes a number of buttons 101a, 101b and 101c, any of which upon depression operates a lever member 102. As particularly shown in FIG. 10, the lever member 102 is placed opposite the button arrangement 101 with an intermediate member 103 being interposed between the lever member 102 and button arrangement 101 so that the lever member 102 will be pivotally operated by the member 103 when any appropriate button is depressed. The lever member 102 has the shape shown, and is pivotally supported on a shaft or screw 104 at the intermediate point thereof, said screw 104 securing the lever member 102 to the chassis designated by 7 but shown schematically. The end portion 102a of the lever member 102 is connected with one end of an adjusting member 107 by means of a spring 106, and the adjusting member 107 is pivotally supported at the other end thereof on a shaft or screw 108 which secures the adjusting member 107 to the chassis. A pin 109 is provided adjacent the adjusting member 107 as shown, and engages in a slot 111 formed by prongs on a head arm member 110 at one end of the arm member 110. The head arm member 110 is pivotally supported on a shaft 112 at the other end thereof, said shaft 112 securing the arm member 110 to the chassis for pivotal movement. A plate 114 on which a head assembly 20 is mounted on the head arm member 110. A spring-loaded screw 116 with a spring designated by 115 therearound is provided between the adjusting member 107 and head arm member 110, said screw 116 passing through the respective bent up portions 107a and 110a of the members 107 and 110. The screw 116 adjustably controls the position of the arm member 110 including the head plate 114 relative to the capstan roller 18. As shown in FIG. 9, the lever member 102 has a pin 117 on the underneath side thereof which engages a substantially L-shaped member 118. The L-shaped member 118 is pivotally supported on a shaft or screw 120 at the intermediate point thereof, said screw 120 securing the member 118 to the chassis 7, and has two armlike portions 118b and 118c, one of which engages the pin 117 of the lever member 102 and the other of which is connected with a spring 119. The spring 119 is normally biased to provide a pulling force on the L-shaped member 118, but the pin 117 of the lever member 102 prevents the L-shaped member 118 from being pulled by the action of the spring 119. The arm 118c of the L-shaped member 118 has a connecting member 121 connected to one end of the arm 118c and the other end of the connecting member 121 is secured a wheel 122 which is located between the depending flange of a drive wheel, or flywheel 123 and a driven wheel 125 having a backward feeding roller 124 coaxially mounted therewith. Thus, when the L-shaped member 118 is pivoted in the direction of arrow 138, it moves the wheel 122 into contact with the flange of the wheel 123 and into contact with wheel 25, and of the drive wheel 123 is imparted to the driven wheel 125 through the wheel 122. Reference numeral 126 designates a backup roller which is engageable with the card 1 by coacting with the roller 124 so that the card 1 can be moved backward. The backup roller is rotatably mounted on a backup roller arm 127 and a spring 12 connected to the end of arm 127 exerts a force on the backup roller 126 to urge the roller 126 closer to the roller 124. A lever member 129 forms part of the card forwarding device and is pivotally connected at one end thereof with the lever member 102 and has the other end extending across the card path 1a so as to be engaged by a card 1 moving along the path 1a such that as the card 1 is moved forward along the path 1a and contacts the lever member 129, the lever member 129 is pivoted so that it will bring the head assembly 20 or pinch roller closer to the capstan roller 18. The driver wheel 123 and a motor 131 are connected by way of a belt 133 which extends around the outer periphery of the drive wheel 123 and pulley 132 on the motor 131.

The operation of the card return device will be described by referring to FIG. 8. When a button 101a, for example, is first depressed in the direction 134 in FIG. 8, the lever member 102 is then rotated on the shaft 104 in the direction 135 and a lever member 143 associated therewith is also rotated on a shaft 144 in the direction of arrow 145. The rotation of the lever members 102 and 143 is followed by movement of a pin 146 a the lever member 143 in the same direction, said pin 146 engaging in a slot 147 in a member 148, thereby causing the member 148 to be rotated about a shaft 149 in the direction 150 while also causing the end 148a to be displaced from the position indicated by the solid lines to the position 148b shown by the dot-dash-lines in FIG. 8. As the end 148a of the member 148 moves as indicated above, a spring 151 mounted on the member 148 is also moved from the position indicated by the solid lines to the position 151a indicated by the dot-dash-lines, and the member 148 is thus maintained in the position 148a shown under the action of the spring 151. As seen from the above, when the button is depressed the required distance, it is retained in the position to which it is depressed. Thus, the end 102a of the lever member 102 is displaced in the direction of arrow 136, causing the adjustable member 107 to turn on the shaft 108 in the direction of arrow 137 and also causing the pin 109 to be moved in the same direction. This also makes the head arm member 110 turn on the shaft 112 in the clockwise direction in FIG. 9 by means of the slot 111 which engages the pin 109, causing the head assembly 20 to be displaced in the same direction by means of the not shown head mounting plate carried by the head arm member 110. As a result, the head assembly 20 is moved away from the capstan roller 18, and thus the card 1 can be moved in the backward direction by means of the rollers 124 and 126 without being contacted and engaged by the head assembly 20. As the lever member 102 turns in the direction 135 as described hereinbefore, the pin 117 is moved in the same direction, and thus the end 118c of the L-shaped member 118 follows the movement of the pin 117 under the action of the spring 119, causing the L-shaped member 118 to turn on the shaft 120 in the direction of arrow 138 and thus causing the wheel 122 to be moved in the direction of arrow 139 toward the flywheel 123 by means of the connecting member 121 and to engage the drive wheel or flywheel 123 as well as the driven wheel 125 so that the driven wheel 125 is driven. The backward feeding roller 124 on the shaft 140 to which the wheel 125 is secured is thus rotated. The pinch roller or backup roller 126 is positioned opposite the backward feeding roller 124, and is engageable with the roller 124 by the action of the spring 128. The card 1 which is now held by and between the two rollers 124 and 126 is then moved backward in the direction 141 to the starting position or any selected position by means of the roller 124 in cooperation with the backup roller 126. As disclosed hereinbefore with reference to the several embodiments shown in the drawings, the present invention provides various advantages and merits. The card forwarding device has the advantage that the card can be moved in the forward direction under the appropriate pressure which is provided by the connection between the lever and arm members, the lever member being operated by placing the card in a starting position and moving it in the forward direction and the arm member being operated in response to the lever member. Accordingly, the member which applies pressure to the card and the capstan roller is only operated when the card is placed on the card path, so that the pressure applying member and capstan roller hold the card therebetween under the required pressure and move it forward without any risk of the card slipping out of the card path. Furthermore, in the card return device, upon depression of the appropriate button to the required position, the lever member 102 is then operated by which the arm member and other associated members including the wheels are operated so that the head assembly is moved away from the capstan roller while at the same time the backward feeding roller is driven for moving the card in the backward direction. As noted above, simply by operating the button, the card can be moved back to the starting position or any selected position without handling the card. An alternative form of the embodiment of the card return device, the lever member 143, control member 148 and spring 151 can be omitted. In this modified form, it is necessary to leave the button to be in the depressed position until the card has moved back to the selected position.

Although the invention has been illustrated with reference to the several preferred embodiments thereof, it should be understood that various changes and modifications may be made without departing from the spirit and scope of the invention.

What is claimed is:

1. A magnetic card reading apparatus for reading information magnetically recorded on a card as it travels along a card traveling path past a magnetic reproducing head assembly in a forward direction, said apparatus having a card forwarding mechanism for moving the card in the forward direction under a constant pressure and at a uniform speed, said card forwarding mechanism comprising:
   a chassis;
   a capstan roller on said chassis on said card traveling path;
   a lever member pivotally supported on said chassis at a point intermediate to the ends thereof on said chassis and normally extending into the path of a card at the beginning of the card traveling path and pivotable upon being contacted by the card as it moves along said path;
   an arm member operatively associated with said lever member and having a portion movable toward said path at the position of said capstan when said lever member is pivoted upon being contacted by a card; and
   a pressure applying member operatively connected with said arm member and moved into pressure applying relationship with said capstan when said arm member is moved in response to a card contacting said lever to grip the card between the pressure applying member and the capstan, whereby the card is moved in the forward direction.

2. The apparatus according to claim 1, wherein said lever member has card guiding means provided at the end of said lever member extending into the card traveling path and engageable with the card traveling along the path.

3. The apparatus according to claim 2, wherein said card guiding means comprises a roller, whereby the card is in rolling contact with said roller.

4. The apparatus according to claim 2, wherein said card guiding means comprises a sliding plate, whereby the card is in sliding contact with said sliding plate.

5. The apparatus according to claim 1, wherein one of said lever member and said arm member has a roller means thereon engaged with the other of said members for connecting said members.

6. The apparatus according to claim 1, further comprising spring means operatively connecting said lever member and said arm member with each other.

7. The apparatus according to claim 1, wherein one of said lever member and said arm member has adjustable means thereon engagable with the other for adjustably controlling the distance between said lever member and said arm member.

8. The apparatus according to claim 7, wherein said adjustable means comprises a screw extending through a portion of one of said members and abutting the other member.

9. The apparatus according to claim 1, wherein said arm member and said pressure applying member are pivotally coaxially connected at one end thereof and said apparatus further includes spring means connecting said arm member and said pressure applying member and adjustable means adjustably controlling the distance between said arm member and said card member.

10. The apparatus according to claim 9, wherein said adjustable means comprises a screw on one of said members abutting the other member.

11. The apparatus according to claim 1, wherein said pressure applying member has a pinch roller rotatably mounted thereon and engageable with said capstan.

12. The apparatus according to claim 1, wherein said pressure applying member has said magnetic reproducing head thereon and engagable with said capstan.

13. The apparatus according to claim 12, wherein said pressure applying member further includes a head assembly supporting plate having said head thereon, spring loaded adjustable means connecting said pressure applying member and said head assembly supporting plate, whereby said supporting plate is acted on by said card pressure applying member for moving the head assembly close to the capstan roller when a card is inserted into said apparatus.

* * * * *